United States Patent [19]

Kruschik

[11] 4,112,965

[45] Sep. 12, 1978

[54] SHUTOFF ELEMENT

[75] Inventor: Julius Kruschik, Gumpoldskirchen, Austria

[73] Assignee: Klinger AG, Zug, Switzerland

[21] Appl. No.: 795,948

[22] Filed: May 11, 1977

[30] Foreign Application Priority Data

May 12, 1976 [DE] Fed. Rep. of Germany ....... 2620905
May 12, 1976 [DE] Fed. Rep. of Germany ....... 2620904

[51] Int. Cl.² ............................................. F16K 49/00
[52] U.S. Cl. .................................. 137/219; 137/334; 137/375
[58] Field of Search ........................ 137/219, 334, 375

[56] References Cited

U.S. PATENT DOCUMENTS 3,970,252  7/1976  Smale et al. ....................... 60/266 X

FOREIGN PATENT DOCUMENTS 15,977  4/1958  German Democratic Rep. ..... 137/219

Primary Examiner—Gerald A. Michalsky
Attorney, Agent, or Firm—Werner W. Kleeman

[57] ABSTRACT

A shutoff element comprising a substantially tubular-shaped outer housing and an axially symmetrical inner housing connected by means of rib-like carriers or supports with the outer housing. The axially symmetrical inner housing serves for receiving at least one closure body which can be displaced in axial direction by means of an associated double-acting work cylinder. Each work cylinder is arranged within the inner space of an inner body formed by the inner housing and the inserted closure body in the open position of the shut-off element and is attached to the inner housing. In the free space about the work cylinder there open inlet openings for a cooling medium, the outlet openings of which, in the direction of flow of a work medium, are formed by a ring-shaped opening between the inner housing and the free end of the closure body.

10 Claims, 4 Drawing Figures

SHUTOFF ELEMENT

BACKGROUND OF THE INVENTION

The present invention relates to a new and improved construction of a shutoff element for working media associated at least with the danger that such can be hazardous to the health of individuals, particularly if leakage occurs.

The shutoff element constructions of the invention can be used in conjunction with hot working media, as such are increasingly required in the nuclear energy industry and in conjunction with stationary gas turbine installations.

SUMMARY OF THE INVENTION

It is a primary object of the present invention to provide improved constructions of shutoff elements affording positive and tight shut-off, so that none of the working medium can arrive at the shutoff section of the tube located downstream with respect to the direction of flow.

Still a further significant object of the present invention aims at the provision of a new and improved construction of shutoff element which effectively shuts-off the flow of a working medium in a highly efficient, reliable and positive manner.

Another object of the present invention aims at a shutoff element, typically a valve, for shutting-off the flow of a working medium, particularly, but not exclusively, media which may be hazardous or dangerous to the health of individuals in the area where the working media flows, and which shutoff element is relatively simple in construction and design, economical to manufacture, extremely reliable in operation, and requires relatively little maintenance and servicing.

Now in order to implement these and still further objects of the invention, it is within the teachings of this development to provide a positive closure by constructing an element with a shutoff at at least one, but possibly two separate seats, and to realize the possibility of employing a blocking medium between such seats.

The shutoff element of the present invention comprises an outer housing, preferably of substantially tubular-shaped configuration, and an axially symmetrical inner housing connected with the outer housing by means of rib-like carriers or supports. The inner housing serves for the reception of at least one, but possibly two, closure bodies. Each closure body is movable in axial direction by the action of an associated double-acting work cylinder.

Such type of shutoff element has been disclosed in German Pat. No. 834,630. However, the ring slide described in this reference does not fulfill any maximum safety requirements, since the closing action is only accomplished by means of the work cylinder which, if the latter fails to properly function, does not afford any positive shut-off or closure, and thus, there cannot be obtained any emergency shut-off.

Also with the prior art ring slides taught in the German Pat. publication No. 1,042,320 and the British Pat. No. 254,870 there are present the same disadvantages.

With the foregoing, as well as with all other heretofore known ring slides, there is present, in each operating position, the shut-off medium for producing small actuation forces in front of and behind the closure body, resulting in pressure equalization.

Other prior art known to applicant in this field is represented by the following patents: U.S. Pat. No. 2,495,081, German Pat. No. 1,244,503, German Pat. No. 622,004, German Pat. publication 1,196,584, German Pat. No. 15,977, German Pat. publication 1,106,572, and German Pat. No. 1,775,015.

It is a further significant objective of the invention to provide an improved construction of shutoff element of the abovementioned type which affords the greatest amount of safety, and, in particular, renders possible emergency shut-off operations.

Now in order to implement these and still further objects of the invention, which will become more readily apparent as the description proceeds, the invention contemplates that each employed work cylinder is arranged in the inner space of the inner body, which in the open position, is formed of the inner housing and the inserted closure body or bodies, as the case may be, and attached to the inner housing. In the free space about the work cylinder there open inlet openings for the cooling medium, the outlet openings of which, in the flow of the work medium, are formed by the ring-shaped openings between the inner housing and the free ends of the closure body.

In the closed position of the shutoff element there is thus present a cooling medium which is of the same type as the work medium, or does not contaminate such work medium. The cooling medium not only serves for cooling purposes, rather also, with the indicated arrangement of the work cylinder, in case of emergency with simultaneous rupture of the main conduit or line and the control lines, provides an emergency shut-off. If this situation arises with the shutoff element open, then the excess pressure of the cooling medium within the closure body located towards the rupture location, and which excess pressure is still present also in the case of rupture of the control lines, moves such closure body somewhat out of its open position. Consequently, the medium which flows very rapidly when the line is ruptured facilitates the entrainment of the closure body and its contact against the valve seat. On the other hand, if the emergency arises in the closed condition, then the working medium presses the conical closure body further against its seat, even upon break-down of the work cylinder.

During normal operation, in other words during such time when the work cylinders are functioning, the cooling medium works as a blocking medium in the closed position, which guarantees for a double-seal of maximum security. With the inventive shutoff element the working medium therefore is not present in the space between both closure bodies in any operating position. Quite to the contrary, there is present in this space cooling-or blocking medium, so that only then there can be rendered possible the strived for safety requirements and at the same time there is realized a pressure compensation or equalization.

As already mentioned there is known to the art a valve from U.S. Pat. No. 2,495,081. The valve described in this patent does permit, in the closed position, the application of a blocking medium between both seats, but there is not present any possibility of the valve closing or remaining in its closed state when there is breakdown of the "mechanical" actuation device. Hence, there is not realized with this valve any possibility of emergency shut-off. Consequently, this prior art valve construction of the just-mentioned reference neither solves those problems solved with the inventive constructions of shutoff elements, nor does it render obvious the provision of an emergency shutoff, much less providing a solution therefor.

In comparison to the state-of-the-art, it is proposed to provide by means of the invention a shutoff element which particularly satisfies high requirements as concerns operational safety. Hence, there is realized a particularly great degree of sealability or high sealing action of the shutoff device since there is employed a blocking medium. Further, there is realized and maintained a shutoff action even upon failure of the actuation device, and this teaching can neither be found nor rendered obvious by the references which have been specifically discussed herein. Moreover, it is additionally mentioned that such safety measures are extremely advantageous and important as concerns protection of the environment.

BRIEF DESCRIPTION OF THE DRAWINGS

The invention will be better understood and objects other than those set forth above, will become apparent when consideration is given to the following detailed description thereof. Such description makes reference to the annexed drawings wherein there have been generally used throughout the various Figures the same reference characters for the same or analogous components, and wherein.

DETAILED DESCRIPTION OF THE PREFERRED EMBODIMENTS

Figure 1:
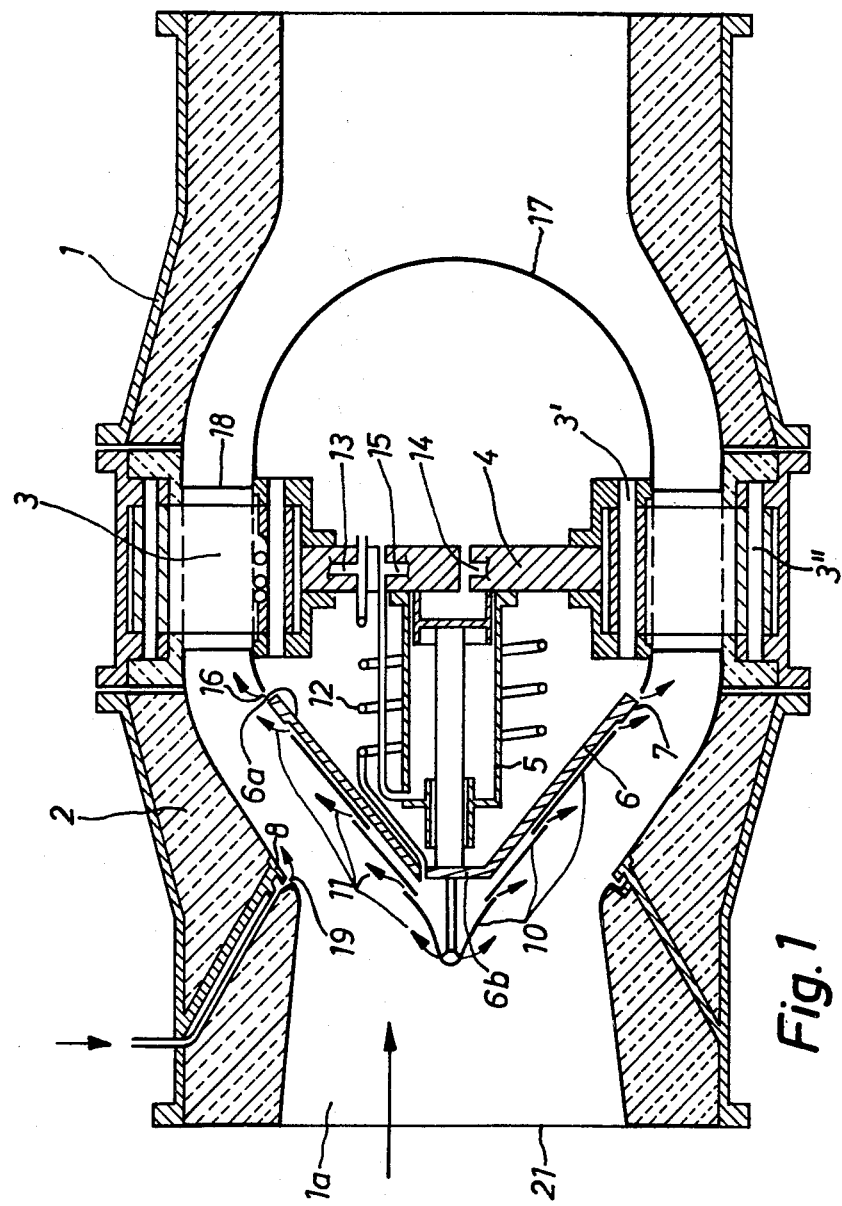
FIG. 1 is a schematic longitudinal sectional view of a first exemplary embodiment of shutoff element constructed according to the invention.
Figure 2:
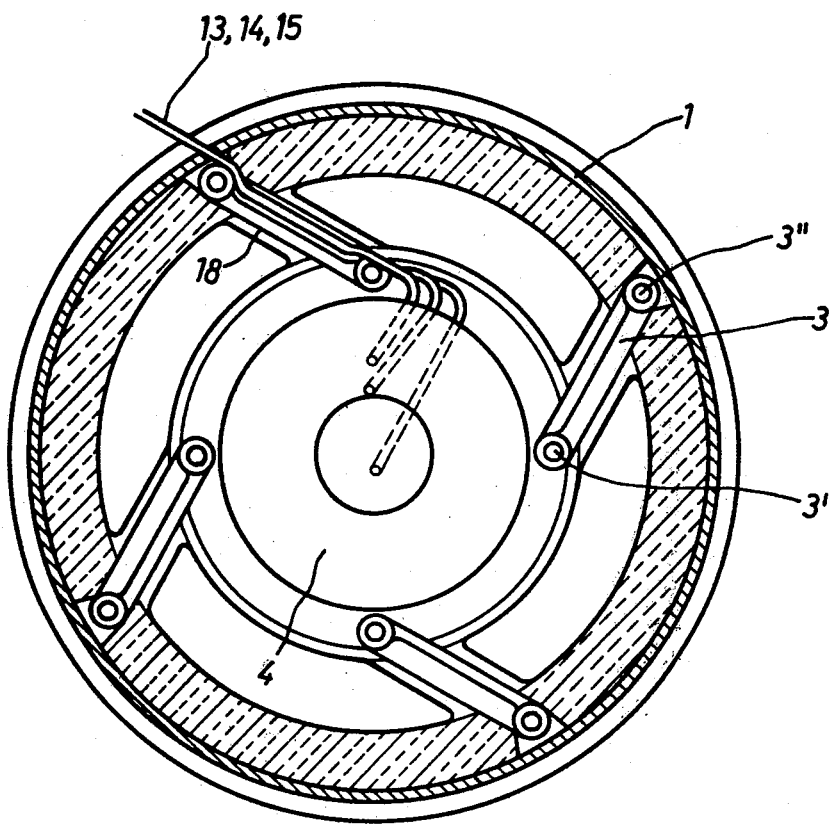
FIG. 2 is a cross-sectional view of the shutoff element illustrated in FIG. 1.

Describing now the drawings, the exemplary embodiment of shutoff element depicted in FIGS. 1 and 2 will be seen to comprise a substantially tubular-shaped three-part outer housing 1 equipped with a thermal inner insulation 2. The outer housing 1 is hingedly connected through the intermediary of four carriers or supports 3 with a support or carrier plate 4 of the inner housing. These carriers or supports 3 are arranged such that they enclose an angle with the radii extending through the hinge points 3′, 3″ formed, for instance, by not particularly referenced, but conventional, hinge or pivot pins. In the embodiment under discussion a double-acting control or work cylinder 5 is attached to the carrier or support plate 4. By means of the control cylinder 5 there is mounted for axial displacement a closure body 6 which converges in conical figuration opposite to the flow direction indicated by the arrow appearing at the left-hand side of FIG. 1. At the region of the largest diameter of the closure body 6, and with the closure body 6 extended by the control cylinder 5, there is disposed that sealing zone 7 which sealingly coacts, under the pressure of the control cylinder 5, with the valve seat 8 arranged at the outer housing 1. Different possibilities are available for the construction of the seat 8 and the sealing zone 7. Advantageously, and apart from the requisite resistance against the prevailing operation temperatures, there should be present a certain elastic deformability, in order to facilitate the mutual accommodation between the seat and the sealing zone of the closure body.

In order to cool the seat 8 and the conical part 6a of the closure body 6 against which impinges the flow, a suitable coolant or cooling medium is introduced into a substantially ring-shaped or annular groove 19 arranged upstream with respect to the direction of flow and just adjacent the seat 8 in the outer housing and also by means of a spirally wound line or conduit 12, compensating the movement of the closure body 6, and inserted beneath the lining or covering 10 of the closure body 6, and from where such cooling medium escapes through substantially ring-shaped gaps 11 and produces a film cooling, especially also for the sealing zone 7. It is also possible to additionally introduce cooling medium into the space between the support or carrier plate 4 and the closure body 6. This cooling medium in the open condition of the closure body 6, escapes through the ring-shaped gap 16 between the lining or covering 17 of the inner housing and the sealing zone 7 for the purpose of film cooling. Also cooling medium can be introduced beneath the lining or covering 18 of the carriers 3 and can serve for the film cooling of such parts. The cooling medium, which advantageously may be the same as the working medium which is to be shut-off, has a greater pressure and lower temperature than such. It is conjointly infed through a conduit or line 13, which like the conduits or lines 14, 15 for the inflowing and outflowing control medium, extend from the outer housing along a carrier or support 3.

With the illustrated embodiment the insulation 2 is arranged at the inside of the outer housing 1 and delimits or bounds the inside of the actual flow channel 1a. In this flow channel 1a there is coaxially mounted the inner body composed of the inner housing 4, 17, 5 and the closure body 6. This inner body, together with the lining or covering 17 of the inner housing and the conical lining 10, which converges at an acute angle, for the free end of the closure body 6, forms the inner boundary of the flow channel 1a when the shutoff element is in open condition or state. As to the illustrated nonclosed flow channel 1a the same has its cross-section narrowing from the opening 21 of the outer housing 1 continuously up to about the region of the conical tip 6b of the inner body. At the region of the conical portion or part 6a of the inner body the cross-section of the flow channel which is of ring-shaped configuration at that location, increases in size again continuously until reaching the largest diameter of the inner body, and at that point it remains approximately constant. The greatest constriction of the flow channel therefore is at the region of the conical tip of the inner body. At this cross-sectional region there is also located the seat. Since the cross-section continuously increases from the seat 8 upstream of the direction of flow and continuously increases in a diffusor-like manner downstream of the direction of flow, there is permissible a reduction of the seat diameter with regard to the diameter of the openings 21, because energy losses are extensively avoided. The reduction of the seat of course facilitates the construction of these important components of the shutoff element.

With the heretofore described embodiment of inventive shutoff element the outer housing 1 is tubular-shaped and like the inner body composed of the inner housing 4, 5, 17 and the lined closure body 6, 10, is axially symmetrical, so that there are already extensively avoided irregular thermal expansions. Due to the previously described manner of articulating or hingedly connecting the carriers or supports 3 the thermal expansion thereof does not directly influence the position of the inner body, because when they heat-up they especially turn the inner body. Furthermore, different thermal expansions of the individual carriers or supports, which only will be slight owing to the uniform arrangement thereof, only have an extremely slight effect. As a practical manner, therefore, the inner body remains in its axial position. Thermal expansions are furthermore also reduced in that the seat in the housing and the surface of the closure body which is impinged by the flow are cooled. There is thus realized an extensively positively sealing shutoff element, even in the case of larger rated widths and high operating temperatures.

A further advantage of the shutoff element of the invention resides in the fact that with the advantageously realized actuation by a flowing control medium, as illustrated, no movable parts need be guided out of the housing, so that there do not arise the therewith otherwise associated considerable problems with regard to thermal expansion and sealing.

Figure 3:
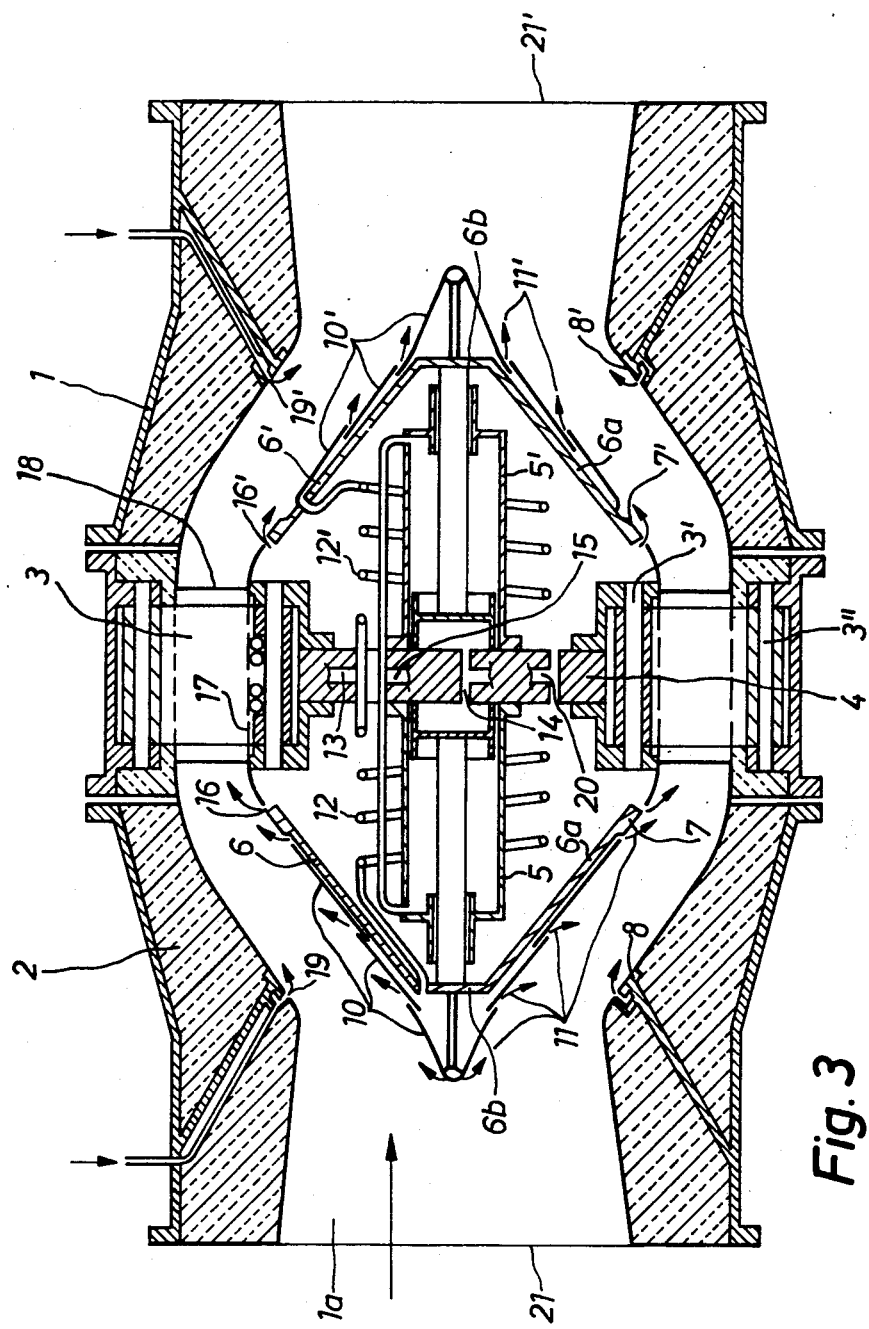
FIG. 3 is a schematic longitudinal sectional view of a second exemplary embodiment of shutoff element constructed according to the invention.
Figure 4:
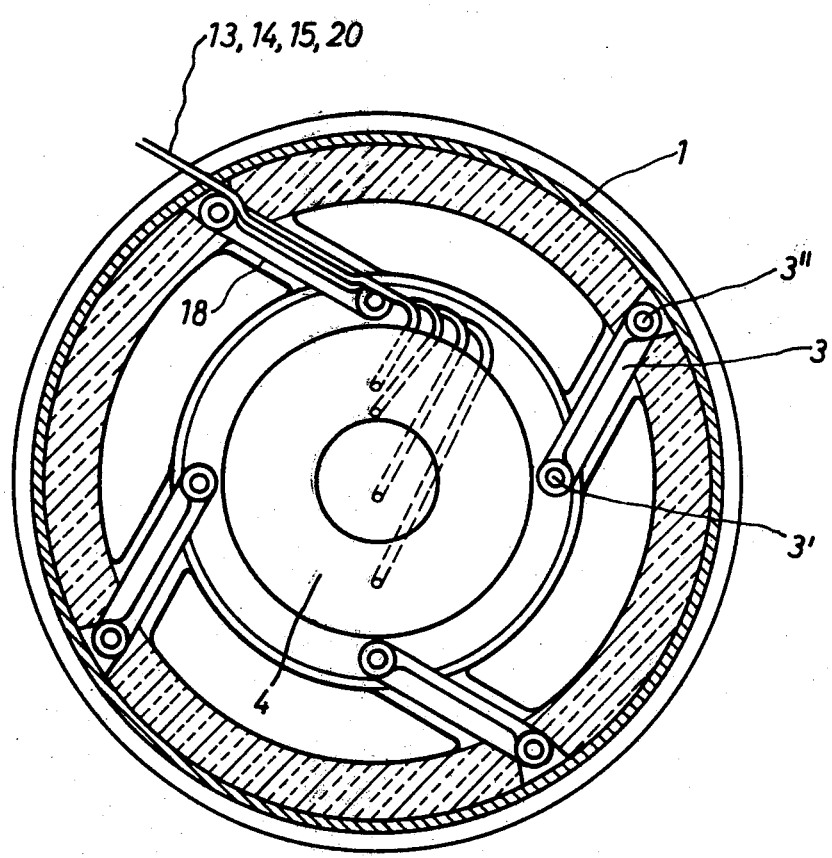
FIG. 4 is a cross-sectional view of the shutoff element illustrated in FIG. 3.

The second exemplary embodiment of shutoff element constructed according to the invention, and as shown in FIGS. 3 and 4, likewise will be seen to comprise a substantially tubular shape 3-part outer housing 1 which widens at its central or intermediate region. At such cylindrically widened central region or portion there are hingedly connected, as previously explained, four carriers or supports 3 for the attachment of the inner housing. The inner housing comprises a support or carrier plate 4 which is hingedly connected with the four carriers or supports 3, for instance by means of suitable pivot pins or the like, and such carriers 3 each have the same inclination with respect to a radius extending through a hinge or pivot point 3', 3" respectively. Thus, in the presence of thermal expansions, the inner housing is retained free of stress in a coaxial position with respect to the outer housing. At the support or carrier plate 4 there are attached, in this embodiment, to both sides thereof the respective double-acting work cylinders 5 and 5'. These work cylinders 5 and 5' displaceably mount a respective closure body 6 and 6' which act in opposite direction with regard to one another, and the free ends of which taper conically from the cylindrical lining or covering 17 of the inner housing towards the free ends. At the region of their largest diameter they carry a respective sealing zone 7 and 7' which cooperate with the seats 8 and 8' respectively, which are attached at the outer housing 1.

In order to close the shutoff element both of the cylinders 5 and 5' are impinged from the side of the support plate 4, so that each sealing zone 7 and 7' comes into sealing contact, under pressure, with the associated seat 8 and 8', respectively, in the outer housing 1. The working medium is thus shut-off at a first upstream located, directly impinged seat 8 and at a second downstream located seat 8'. In the space between both of these seats 8 and 8', in the closed position of the shutoff element, there is delivered by means of a conduit or line 20 guided along one of the supports or carriers 3 and through the support plate 4 a blocking medium within the cylindrical lining 17 of the inner housing and at that location fills the entire space between both of the seats 8 and 8'. In the event that the blocking medium possesses a smaller pressure than the working medium, then in the presence of possible leaky locations at the first seat 8 working medium could enter into the space between the seats 8 and 8' which is filled with the blocking medium and could be flushed away by such during continuous throughflow. In the event the blocking medium is at a greater pressure than the working medium, then if there are present leakage or leaky locations at the first seat 8, blocking medium can penetrate upstream with respect to the direction of flow, and thus can positively prevent the throughflow of the working medium. The second downstream situated seat 8' forms a safety shut-off or closure and additionally shuts-off or blocks the downstream located conduit section from the blocking medium.

In the closed position of the shutoff element the blocking medium increases the pressure applied to the seats. In the event that it possesses a greater pressure than that of the working medium, then even in the absence of the control medium which brings about pressing of the closure bodies 6 and 6' against the seats 8 and 8' by the action of the work cylinders 5 and 5' respectively, there can be realized a further maintenance of such sealing function, since the closure body is entirely impinged from the inside by the blocking medium and thus provides the necessary contact force. In the event that also the blocking medium is not present, then by the action of the working medium itself the downstream located closure body 6' is pressed by the flow pressure against the second seat 8' and thus brings about an emergency shut-off. On the other hand, if at the upstream located region there arises a sudden leakiness with loss in pressure, for instance due to rupture of a heat exchanger, then the upstream located closure body 6 is pressed under the pressure of the downstream still present medium against the first seat 8, so that also in this case there is positively realized an emergency shut-off.

The embodiment of shutoff element constructed according to the invention as discussed with the previously illustrated example, is designed for handling higher thermal loads and therefore, possesses an insulation 2 at the outer housing 1, and which insulation delimits towards the outside the actual flow channel 1a. In this flow channel 1a there is coaxially mounted the inner body composed of the inner housing 4, 17, 5, 5' and the closure bodies 6 and 6'. This inner body forms by means of the cylindrical lining of the inner housing 17 and the conical linings 10 and 10' for the free ends of the closure bodies, and which linings converge at an acute angle, the boundary at the inside of the flow channel in the open condition of the shutoff element. With respect to the illustrated non-closed flow channel, its cross-section tapers from both openings 21 and 21' of the outer housing 1 continuously up to approximately the region of the associated conical tip of the inner body. At the region of the conical components of the inner body the cross-section of the therelocated ring-shaped flow channel again continuously increases towards the cylindrical middle or central portion. The greatest constrictions of the flow channel thus are at the region of the conical tips of the inner body. At this cross-sectional region there are also located the seats. Since the cross-sections of the seats 8 and 8' continuously increase in a diffusor-like manner both upstream and downstream, there is permissible a reduction of the seat diameter with respect to the diameter at the openings 21 and 21', because there are extensively avoided energy losses. The reduction of the seat of course facilitates the construction of such are important component of the shutoff element.

With the embodiment under discussion there is also provided cooling of the seats 8 and 8', in that cooling medium can be infed to the annular or ring-shaped grooves 19 and 19' located upstream and relatively closely adjacent to the seats 8 and 8' respectively, this cooling medium wipingly contacting these seats in the open condition of the shutoff element. In the linings 10 and 10' of the free ends of the closure bodies there are likewise provided ring-shaped gaps 11 and 11', respectively to which there are delivered cooling medium from the support or carrier plate by means of a spirally wound respective conduit or line 12 and 12' which compensates the movement of the closure bodies 6 and 6'. Such cooling medium cools in a film-like manner the conical free end of the related closure body. Cooling medium can also additionally be infed to the space between the carrier plate 4 and the closure bodies 6 and 6', in order to depart out of the ring-shaped gaps 16 and 16' between the linings or coverings 17 of the inner housing and the sealing zones 7 and 7'. Also, cooling medium can be supplied beneath the lining or covering 18 of the carriers 3 and can be used for the film cooling of these parts. The cooling medium, which may be advantageously the same as the work or working medium which is to be shutoff, possesses a greater pressure and lower temperature than such. It is delivered by means of the lines or conduits 13 and 20, which like the lines 14 and 15 for the inflowing and outflowing control medium are guided from the outer housing along a carrier or support 3.

In the embodiment under discussion there is provided a shutoff element which, owing to the linear through-passage enclosing an inner body, is favorable from the standpoint of the flow and renders possible a double shut-off in two spatially separated seats. Moreover, the space which is formed in the closed position of the shutoff element between both of the seats is impinged by a blocking medium. This blocking medium can either possess a lower pressure than the working medium and in the closed position of the shutoff element can flush away working medium which flows through the first upstream located seat, or in comparison to the working medium can possess an excess pressure, so that in the presence of possible leaky locations at the first seat it can penetrate into the downstream located pipe or conduit section, while displacing the working medium. In so doing, the blocking medium acts upon the closure bodies and applies an additional pressure force to the seats, which is also maintained even in the event of failure of the actuation device of the shutoff element. In the event that not only the actuation device fails, but also the blocking medium only has too low a pressure or no pressure, the working medium presses the other downstream located closure body against the second seat. During complete functioning of the shutoff element there is thus insured that no quantity of working medium reaches the downstream located pipe or conduit section. In the event of failure of the actuation device and the blocking medium there is insured, in any event, still a shut-off action at the second downstream located seat. The described shutoff element thus affords a shut-off action which is secured a number of times.

A further advantage of the shutoff element resides in the fact that, as illustrated, with the advantageous actuation which is employed by means of a flowing control medium none of the moved parts must be guided out of the housing as previously equally mentioned with regard to the first embodiment, so that here also there do not arise the therewith associated greater problems with respect to sealing and thermal expansion.

It is advantageous that in the open position of the shutoff valve, the shape of the inner body composed of the inner housing and the inserted closure bodies is cylindrical at the central portion and is conical at the portions merging at both sides which are formed by the free ends of the closure bodies. Hence, the cross-section of the non-closed flow channel continuously reduces from each of both openings of the outer housing approximately to the associated conical tip of the inner housing, then thereafter continuously increases at the region of the conical parts up to the intermediate or central portion and then is constant. In this way there is realized a diffusor action, so that without any appreciable energy losses, there are possible cross-section reductions at the regions of the seats and which favorably influence the size and function of the shutoff element.

A particularly advantageous construction is realized in that the inner housing possesses a substantially cylindrically lined or covered, disk-shaped support or carrier plate arranged perpendicular to the axis, for taking-up or supporting all of the devices of the inner body, and the supports or carriers between the inner housing and outer housing are hingedly connected with an inclination possibly deviating from the radius, on the one hand, at the support plate, and, at the other hand, at the outer housing.

Advantageously, all of the connections in the form of pipe conduits, rods or the like between the outer housing and the inner housing needed for actuation and other functions, are arranged along the supports, so that also these devices do not have any effect upon the central mounting of the inner housing.

What is also advantageous is if at least the conical parts of the closure body and the region of the seats are equipped with heating- or cooling devices. As a result, there are obtained at the seats more favorable thermal conditions for sealing and at the other heated or cooled parts of the shutoff element more favorable load and flow conditions.

What is also favorable is to construct the cooling devices as outlets for cooler medium which flows in a filmlike manner about the locations which are to be cooled, constituting an effective and nonetheless relatively rational cooling technique.

Since the pipe conduit for the heating- or cooling medium, respectively, is spirally wound from the support plate to each conical part of the closure body it is possible to obtain without the use of any packing bushings a tight conduit connection between the support plate and the relatively displaceable closure bodies.

In the embodiment according to FIG. 3 with the flow direction of the working medium in the main claim line as shown, an emergency closing of the shutoff device occurs in case of a rupture of the main line upstream of the shutoff device. Due to the site of rupture the pressure of the working medium collapses upstream of the shutoff valve and a reversal flow of the working medium occurs whereby due to the assistance of the pressure of the cooling medium, as already described, an emergency closing of the shutoff device is achieved.

A flow against the shutoff device according to FIG. 3 in the opposite direction as compared with the flow direction shown is, however, also possible, in which case an emergency closing then occurs, if the site of rupture lies downstream of the shutoff device. In the latter case the cooling slots must be differently arranged.

While there are shown and described present preferred embodiments of the invention, it is to be distinctly understood that the invention is not limited thereto, but may be otherwise variously embodied and practiced within the scope of the following claims. Accordingly,

What I claim is:

1. A shutoff element for a work medium comprising:
a substantially tubular-shaped outer housing;
an inner housing arranged within said outer housing;
substantially rib-shaped supports for connecting said inner housing with said outer housing;
at least a first displaceable closure body arranged at said inner housing;
said inner housing including at least one double-acting work cylinder for displacing said closure body;
said inner housing and said closure body forming an inner body having an inner space in the open position of the shutoff element;
said double-acting work cylinder being arranged in the inner space of said inner body and carried by said inner housing;
said double-acting work cylinder having a free space about said work cylinder;
inlet means for a cooling medium opening into said free space;
means defining outlet opening means for the cooling medium in the direction of flow of the work medium;
said outlet opening means being formed by at least one substantially ring-shaped opening between the inner housing and a free end of the closure body.

2. The shutoff element as defined in claim 1, further including:
a second displaceable closure body axially movable in a direction opposite to the direction of movement of the first closure body;
said inner housing including a further double-acting work cylinder for displacing said second closure body;
said inner body comprising said inner housing and the first and second closure bodies and containing said inner space in the open position of the shutoff valve;
said further double-acting work cylinder being arranged in said inner space of said inner body and surrounded by a free space;
inlet means for a cooling medium opening into said free space surrounding the further work cylinder;
means defining further outlet opening means for the cooling medium in the flow direction of the work medium;
said further outlet opening means being formed by a substantially ring-shaped opening between the inner housing and a free end of the second closure body.

3. The shutoff element as defined in claim 2, wherein:
the shape of the inner body is substantially cylindrical at a central portion thereof and at portions merging to both sides of said central portion and formed by free ends of the closure bodies is substantially conical;
said outer housing having openings at opposed ends and said outer housing and said inner housing defining therebetween a flow channel;
the cross-section of the flow channel, when the shutoff element is not closed, continuously reducing from both openings of the outer housing approximately up to an associated conelike tip of the inner body, thereafter at the region of the conical portions continuously again increasing up to the central portion and at that location being substantially constant.

4. The shutoff element as defined in claim 2, wherein:
said inner housing is provided with a substantially cylindrical lined, disk-shaped support plate arranged substantially perpendicular to the lengthwise axis of the shutoff element and containing media conduit means;
each support plate carrying an associated one of said work cylinders;
means for hingedly connecting the rib-shaped supports between the inner housing and the outer housing at the support plate and at the outer housing.

5. The shutoff element as defined in claim 4, wherein:
said hingedly connecting means connects said rib-shaped supports at an inclination deviating from a radius.

6. The shutoff element as defined in claim 2, further including:
connection means extending along the rib-shaped supports and located between the outer housing and the inner housing for performance of actuation and other functions.

7. The shutoff element as defined in claim 2, wherein:
each of said closure bodies is provided with a seat;
and means for affecting the thermal conditions of at least conical portions of the closure bodies and the region of each said seat.

8. The shutoff element as defined in claim 7, wherein:
said means for affecting the thermal conditions comprises heating means.

9. The shutoff element as defined in claim 7, wherein:
said means for affecting the thermal conditions comprises cooling means.

10. The shutoff element as defined in claim 9, wherein:
said cooling means is structured as outlet means for cooler medium which flows in a film-like manner to locations of the shutoff element which are to be cooled.

* * * * *